United States Patent [19]

Juch et al.

[11] Patent Number: 5,292,461
[45] Date of Patent: Mar. 8, 1994

[54] PROCESS FOR THE PRODUCTION OF PELLETS

[76] Inventors: Rolf-Dieter Juch, Schaenggelistr. 32, CH-4612 Wangen b. Olten; Gerd Birenbach, Weidweg 693, CH-4616 Kappel (SO), both of Switzerland

[21] Appl. No.: 748,686

[22] Filed: Aug. 22, 1991

[30] Foreign Application Priority Data

Aug. 24, 1990 [CH] Switzerland ............. 02760/90-8

[51] Int. Cl.⁵ .................................. B29B 9/08
[52] U.S. Cl. ................................ 264/37; 264/114; 264/117; 23/313 R
[58] Field of Search ............ 264/37, 114, 117; 23/313 R, 313 P

[56] References Cited

U.S. PATENT DOCUMENTS

| | | | |
|---|---|---|---|
| Re. 27,214 | 11/1971 | Nakahara | 264/117 |
| 3,206,528 | 9/1965 | Coombs | 264/114 |
| 3,278,661 | 10/1966 | Beck | 264/117 |
| 3,913,384 | 10/1975 | Glatt et al. | |
| 4,111,371 | 9/1978 | Melliger | |
| 4,511,093 | 4/1985 | Ohkoshi et al. | |
| 5,011,640 | 4/1991 | Zanchetta | 264/69 |
| 5,033,953 | 7/1991 | Holley | 425/140 |

FOREIGN PATENT DOCUMENTS

| | | | |
|---|---|---|---|
| 0228633 | 7/1987 | European Pat. Off. | 264/114 |
| 2924342 | 11/1980 | Fed. Rep. of Germany | |
| 3321716 | 12/1984 | Fed. Rep. of Germany | |
| 976603 | 12/1964 | United Kingdom | 264/114 |

*Primary Examiner*—Mary Lynn Theisen
*Attorney, Agent, or Firm*—Lorusso & Loud

[57] ABSTRACT

Pellets are produced in a mixing vessel. In this process, the material to be pelletized is passed through a propeller-like mixer with a helical centrifugal motion and sprayed with a finely nebulized wetting agent until pellets of the desired size have been formed. High yields of well-rounded pellets can be obtained in this way. The pellets can be coated for the purpose of controlled release of the active ingredient.

24 Claims, No Drawings

PROCESS FOR THE PRODUCTION OF PELLETS

The invention relates to a process for the production of pellets, to a corresponding device and to pellets produced therewith.

Pellets are approximately spherical bodies with a diameter of between about 0.5 mm and about 2.5 mm and either they contain one or more active ingredients such as e.g. drugs, pesticides, herbicides, fertilizers, agents for personal hygiene, reagents or industrial dust, or they can be inert carriers like the normally sugar-based pellets which are free from active ingredient, without containing sugar or starch.

Compared with conventional forms of administration, the administration of pellets containing drugs, filled into capsules or compressed into tablets, or else in the form of suspensions, affords significant therapeutic advantages: pellets are normally distributed freely and without hindrance in the gastrointestinal region, optimize drug absorption in respect of a higher reproducibility of active ingredient levels in the plasma, and reduce possible side-effects while at the same time almost completely avoiding locally harmful concentrations of the active ingredient, without diminishing the bioavailability of the active ingredient.

A further advantage of pellets is that they can ideally be provided with shells which permit controlled release of the active ingredient. The controlled release can consist of resistance to gastric juices and/or delayed release of the active ingredient by the pellets.

The use of pellets opens up unforeseen possibilities in the development of novel oral forms of administration: several active ingredients, even those which are chemically incompatible with one another, can easily be incorporated into one form of administration, different active ingredients can be released at different places in the gastrointestinal region, and pellets of the same active ingredient with different rates of release can be administered in a single dosage form.

In addition, on account of their low ratio of surface area to volume, pellets offer ideal conditions for the application of shells. The spherical shape of pellets, their substantially uniform size and their smooth surface favor the reproducibility of the controlled release of the active ingredient after such a shell has been applied. The proportions are very different for granules or imperfectly rounded extrudates, for example, where the irregular particle shape impairs the reproducibility of the application of shells, and where, in principle, far larger amounts have to be applied in order to build up a completely closed shell.

The spherical shape of pellets additionally has the advantage that, by virtue of the good flow properties, uniform volumes and easily reproducible filling weights can be obtained with different forms of administration. This applies especially to filling into hard gelatin capsules or compression into tablets. Favorable pellet size and density are a prerequisite in all cases. Furthermore, pellets can be colored, for example for differentiation purposes and for reasons of acceptability. Also, they can easily be flavored.

Pellets can be made up as follows:

1. The active ingredient can be embedded in finely divided form in a matrix within the pellet, said matrix as a rule being composed of polymers. The mixing of the matrix-forming substance with other components, and their concentration, determine the controlled release.

2. The active ingredient can be applied like a shell around a preformed pellet which is free from active ingredient.

3. Pellets can be composed of agglomerates of the active ingredient. A variety of auxiliaries are generally required here.

To achieve controlled release, pellets of the last two types mentioned can coated. The active ingredient can be released by dissolution of the shell or by the diffusion of dissolved active ingredient through pores in the shell.

Pellets of the type described above can also be provided with a shell in order to protect active ingredients and to improve handling.

Pellets can be produced by a very wide variety of methods, although only a few processes are of practical significance.

A widespread method of pellet production involves the use of coating pans. These devices are as a rule less expensive than other apparatuses and machines. Pellets are formed in the coating pan directly through the rolling motion of the material. The desired pellet size is then obtained as a rule by means of a series of sieving processes.

A disadvantage of pellet production in a coating pan is that the material to be pelletized is subjected to high thermal stress over prolonged drying periods; this applies most especially to the case where the operation is carried out with water, aqueous solutions or aqueous dispersions. Moreover, the abrasion of pellets during the drying phase often presents a problem because it can lead to dust formation and to associated safety problems for the personnel. Also, pellets tend to slide in the coating pan, which is diametrically opposed to the ideal rolling motion. Often the material to be pelletized is also seen to deposit on the inside of the pan during the production process; this build-up of material again leads to disturbances in the rolling motion and to unpredictable losses of material.

To mitigate the disadvantages described, the coating pan frequently requires complicated air ducting technology. Air inlet as well as outlet systems, and also the arrangement of the spraying device and the throughputs of air, are very difficult to standardize and have a direct influence on the production process and the resulting product. Therefore attempts have often been made to mitigate the disadvantages of long process times by using organic solvents. This entails other disadvantages such as e.g. increased environmental pollution or extremely expensive recovery processes and, finally, the virtually unavoidable presence of solvent residues in the finished product.

All in all, pelleting in a coating pan is rather unsuitable because of imperfect reproducibility of the process and unsatisfactory homogeneity of the pellets. In addition, the production process must be accompanied by intensive analytical studies because of the inadequate monitoring of the process and the difficulty of validating it; this makes the process appreciably more expensive.

Another known process for the production of pellets consists in extruding the prepared moist material to be pelletized, containing the active ingredient, then rounding the extrudate while it is still deformable, and finally drying and fractionating the product.

Although there are various types of extrusion in this process, it always contains the following three fundamental steps: mixing of the active ingredient with auxiliaries, if appropriate, and wetting; compression by extrusion; and rounding, e.g. on a Spheronizer, because the extrudate has irregular oblong cylindrical shapes.

The high pressure which is generated during extrusion considerably heats up the material to be pelletized, thereby making it impossible to use this process for temperature-sensitive active ingredients. The high and unpredictable loss of liquid resulting from the same cause impairs the reproducibility of the process and can e.g. make the rounding of the extrudate very much more difficult.

Due to the poorly reproducible composition of the extrudate and the fact that only a limited amount of extrudate can be rounded on a Spheronizer, the continuous production of pellets by this method is only possible under very difficult conditions.

Moreover, specialized personnel are required to operate the extrusion process successfully.

Pellets can also be produced by means of fluidized bed technology nowadays. For all the devices which can be used for this purpose, the standardization of the process air is of great importance; although correct adjustment of the heat content and moisture content of the air stream gives the process reproducibility, the pellets produced are as a rule porous and often imperfectly rounded, which is known to constitute poor conditions for the subsequent coating of said pellets.

The large quantities of air, which are frequently charged with organic solvents, necessitate expensive recovery units and on the whole increase the cost of the process, which is already expensive per se in terms of energy and devices. In addition, said process cannot generally be used to produce highly compressed pellets, which as a rule would be desirable for dosage reasons in the case of active ingredients to be used in high doses for oral administration.

Furthermore, it is also possible to use modified centrifugation devices for the production of pellets. The advantages here are low production costs, flexibility as regards the operating conditions, and simplification of the automation. The disadvantages, however, are the high capital costs incurred by the expensive machines and their costly installation.

Numerous modifications of such devices are commercially available, but as a rule they all contain an air inlet-outlet system, a filtering device, a spraying system and safety and monitoring systems. The process is characterized principally by the use of a rotating disc. Centrifugal and gravitational forces act on the product while a wetting agent is sprayed into the fluidized bed. In this way, it is possible to obtain pellets of excellent roundness directly from pulverulent starting materials, e.g. mixtures of active ingredient and auxiliaries, which has the consequences of rapid process times and low product losses.

Despite their similar construction, these devices are as a rule equipped in a very product-specific and production-specific manner, entailing high investment costs.

Now, the object of the invention is to find a process for the production of pellets which has on the one hand the advantages of modified centrifugation devices in terms of rounding of the pellets, short production time and good reproducibility, and on the other hand, if appropriate, the advantage of high compression, e.g. as achieved by means of extrusion processes, without at the same time having the disadvantages of the devices and processes of the state of the art. The process should be universally applicable to a large number of active ingredients, on the basis of pellets which are free from active ingredient, or on the basis of a powder mixture of the active ingredient, if appropriate with auxiliaries, or else on the basis of a combination of both. In principle, it should be possible to carry out the process under aqueous or aqueous-alcoholic conditions.

It has now been found, surprisingly, that this object can be achieved by the process for the production of pellets characterized in that the material to be pelletized is passed through a mixer with an appropriate helical centrifugal motion in an orbit in the direction of motion of the mixer in the mixing vessel and, by continuous or batchwise application of finely nebulized wetting agent, which may contain a binder, to said material unit the relative moisture content is at least 70%, measured in the stream of material, the agglomeration of said material is maintained until pellets with a diameter of 0.5 mm to 2.5 mm, preferably 0.8 mm to 1.4 mm, are obtained. This object is also achieved by the device for production of such pellets comprising a mixing vessel of at least 500 ml in size and a mixer which has at least three horizontally arranged propeller-like blades fixed to a vertically arranged shaft and sweeping approximately the whole of the vessel floor with a small clearance, and has one or more nozzles suitable for applying wetting agent.

Material to be pelletized is understood as meaning at least one active ingredient, if appropriate in combination with at least one auxiliary and/or pellets, crystals or other initiating particles which are free from active ingredient.

The amount of the necessary finely nebulized wetting agent depends mainly on the composition of the material to be pelletized. The ideal moisture content of said material can be described by means of the concept of "snowball consistency" used in granulation technology, meaning that a sample taken from the mixer and squeezed in the hand retains an impression of the hand without disintegrating.

The appropriate moisture content can measured by determining the relative moisture content of the material to be pelletized. The increase in relative moisture content can be measured during the production process by means of suitable sensors such as electronic moisture probes (e.g. from Datacontrol, manufactured by Stankowitz Delmenhorst, Germany). Pellet formation normally starts when the relative moisture content of the material to be pelletized is 70%, passes through a maximum in the region above 90% relative moisture content and reaches a critical state at values of approx. 100% relative moisture content, when said material tends to agglomerate.

The addition of the wetting agent and the helical centrifugal motion of the material to be pelletized in an orbit in the direction of motion of the mixer are maintained until the pellets have the desired diameter of approx. 0.5 mm to 2.5 mm, preferably 0.8 mm to 1.4 mm. Then either the pellets are first dried, which can normally be carried out on trays in forced-air cabinets or by means of fluidized bed drying, and then the desired class of pellet size is separated from the oversizes and/or undersizes, e.g. by sieving, or the pellets are first separated into the individual fractions while still moist, and dried afterwards. The undersizes can easily be returned into the material to be pelletized, as can the oversizes after comminution, so that the loss of material is normally less than 10% and in some cases even less than 2% over several cycles of the production process.

All known solvents are suitable as wetting agents. Surprisingly, it has been found that even water is outstandingly suitable as a wetting agent for the production of pellets. This makes it possible to avoid the safety problems which can arise when using organic wetting agents, and undesirable organic solvent residues in the pellets. Of course, mixtures of water and alcohols, for example, are also suitable as wetting agents.

Preferably, the wetting agent is sprayed continuously or batchwise on to the material to be pelletized, fast-moving material requiring a faster addition of the wetting agent and slow-moving material requiring a slower addition. Droplet size, spraying pattern and spraying rate are to be adapted in each case to the material to be pelletized or to its ability to absorb the wetting agent, in order to obtain pellets according to the invention.

According to the invention, the speed range of the mixer can vary considerably. In principle, however, the production of pellets in larger mixers requires lower speeds. The mixer will normally operate in the speed range from 100 to 500 rpm when the production batches of material to be pelletized are up to 20 kg and in the speed range from about 40 to 200 rpm when the production batches are from 20 to about 200 kg.

According to the invention, overheating of the material to be pelletized does not occur because temperatures of 40° C. are not exceeded and vary as a rule in the range between 25° C. and 35° C. Of course, if required, the process can also be carried out at higher temperatures of up to approx. 80° C. if the active ingredient allows it or indeed demands it.

As a rule, the production time of pellets on the manufacturing scale does not exceed 360 minutes and is preferably in the range between 30 and 120 minutes, being essentially dependent on the size of the production charge.

Thus the conditions of the production process according to the invention are so mild on the material that it can also be used for processing very temperature-sensitive material to be pelletized. The use of a special cooling system is not normally necessary but, if required, cooling can easily be achieved, e.g. by using double-walled mixers capable of being cooled.

Thus, according to the invention, the formation of pellets depends mainly on the composition of the material to be pelletized, the type and speed of motion of said material and the physicochemical properties and moisture content of said material.

All the process steps are simple to carry out and monitor; if oversizes and undersizes of pellets have the same composition as the residual material to be pelletized, they can reutilized without high analysis costs.

Another advantage of the process is that at least part, but preferably the whole amount, of the material to be pelletized can be initially introduced into the mixer, this mixture no longer having to undergo any change during the process except that of being sprayed e.g. with water.

The process can be accelerated by the use of initiating particles such as e.g. reutilizable undersizes of the material to be pelletized, crystals of the active ingredient or suitably sized pellets which are free from active ingredient.

In another variant of the process, where initiating particles are used, at least part of the material to be pelletized is sprinkled continuously or batchwise on to the rotating particles, with the simultaneous use of a wetting agent, and the layer application of said material is continued until pellets of the desired size have been formed.

This process variant shortens the duration of the production process and increases the yield of pellets with approximately the same diameter.

When pellets which are free from active ingredient are used as initiating particles, the oversizes and undersizes of pellets and the residual powder component can easily be reincorporated into subsequent production charges after grinding and, if appropriate, analysis.

The process according to the invention makes it possible to produce pellets of excellent roundness and with a smooth surface, which is of great importance especially when they are provided with a shell for the purpose of controlled or delayed release of the active ingredient.

When mixers with high shear forces are used, it is possible, according to the invention, to produce pellets whose compression is comparable to that obtained in the extrusion process, without having to accept the disadvantageously high pressures and the associated high temperatures of the extrusion process.

Compared with pellet production in coating pans, it is possible to use a considerably broader spectrum of material to be pelletized. The process is universally applicable to active ingredients of very wide chemical and physical diversity. Possible alternative starting materials are pulverulent active ingredients, crystalline active ingredients as initiating particles or else suitably sized pellets which are free from active ingredient.

According to the invention, active ingredients which are suitable for pelleting include drugs for humans and animals, pesticides, herbicides, fertilizers, agents for personal hygiene, reagents or industrial dust. The active ingredients can be soluble, sparingly soluble or insoluble in water.

However, the process can also be used for the production of pellets which are free from active ingredient and which are distinguished by the absence of sugar and starch.

Pellets with a content of active ingredient of up to 100% can be produced by the process according to the invention. This is advantageous e.g. for drugs which are to be used in high doses and which normally have to be filled into suitable hard gelatin capsules whose size remains acceptable.

Examples of groups of active ingredients which are capable of exerting a local or systemic action in humans and animals are parasympathomimetics, parasympatholytics, spasmolytics, sympatholytics, sympathomimetics, sedatives, tranquillizers, neuroleptics, antidepressants, psychostimulants, anorectics, analgesics, antirheumatics, antiepileptics, antiemetics, antiarrhythmics, antihypertensives, diuretics, antitussives, bronchospasmolytics, therapeutic agents for ulcers, cholagogues, antihistamines, antibiotics, chemotherapeutic agents, anthelmintics, corticoids, vitamins etc. They also include substances for the treatment of coronary heart diseases, peripheral circulatory disturbances, venous diseases, hyperlipidaemia etc.

Examples of water-soluble active ingredients are potassium chloride, procainamide hydrochloride, amphetamine sulphate, phenmetrazine hydrochloride, propanolol hydrochloride, cimetidine hydrochloride, dextromethorphan hydrobromide, ephedrine hydrochloride, prednisolone, allopurinol, tetracycline hydrochloride etc.

Active ingredients of limited solubility in water are erythrityl tetranitrate, acetazolamide, chlorpropamide, erythromycin, bismuth subcitrate, pyrvinium pamoate, amoxicillin, hydrochlorothiazide, triamterene, ibuprofen, piroxicam, nifedipine, diclofenac etc.

Active ingredients with moderate solubility properties in water are atenolol, furosemide, nitrofurantoin, nicotinic acid, pancreatin etc.

The active ingredients can be used in the form of their free base or acid, in the form of complexes or pharmaceutically acceptable salts such as e.g. hydrochlorides, hydrobromides, sulphates or oleates, or in the form of their esters, ethers or amides.

A suitable agent for personal hygiene is e.g. ATP, a suitable fertilizer is e.g. organic-mineral fertilizer, a suitable herbicide is e.g. Mecoprop, a suitable insecticide is e.g. Fenthion and a suitable industrial dust is e.g. wood dust.

Starting materials which can used for the production of pellets which are free from active ingredient are e.g. modified cellulose, cellulose, lactose, calcium carbonate, kaolin, barium sulphate, calcium phosphate, bentonite, calcium sulphate, talc, mannitol, sorbitol, xylitol and polyacrylates.

As a rule, the active ingredients which can be used according to the invention are in the dry form, as are the auxiliaries and starting materials which may be used for the production of pellets which are free from active ingredient. Active ingredients which are in liquid form can also be used up to an amount in which they are still absorbed by the remaining material to be pelletized to an extent which allows said material to continue flowing freely.

The auxiliaries which can be used according to the invention are known from granulation and tableting technology and consist of fillers, binders, disintegrating agents, lubricants, surface-active agents and agents controlling the release of the active ingredient, which can be added to the active ingredient individually or in a desired combination.

Fillers are added to the material to be pelletized mainly when it is desired to reduce the amount of active ingredient. Examples of fillers are especially lactose, sucrose, dextrose, mannitol, xylitol or other sugar alcohols, calcium sulphate, calcium carbonate, magnesium oxide, kaolin, cellulose and starch, as well as derivatives thereof.

The uniformity of pellet size, the pellet formation and the quality of the pellet surface are substantially influenced by the binder.

Examples of suitable binders are starch, modified starches, gelatin, polyvinylpyrrolidones, cellulose or derivatives thereof, polyacrylamides, polyvinyl alcohols and vinylpyrrolidone/vinyl acetate copolymers.

Examples of suitable disintegrating agents, which can be added to the dry material to be pelletized, are various forms of starches, celluloses, alginates, plant-based swelling agents and clays, Crosspovidone and ion exchanger resins.

Examples of lubricants which can be used are stearic acid, metal soaps, hydrogenated vegetable oils, glycerol monostearate, talc, polyethylene glycols and oils.

Examples of suitable surface-active agents are sodium laurylsulphate, sugar esters, sodium dioctylsulphosuccinate, polyoxyethylene sorbitan esters, poloxamers, ethoxylated triglycerides and lecithins.

As agents influencing the release of the active ingredient, it is possible to use e.g. stearic acid or metal soaps, fatty alcohols, hydrogenated vegetable oils, polyethylene glycols, surface-active agents such as e.g. sodium laurylsulphate, or polysorbates, as well as polyacrylates, cellulose, lactose, sucrose, sodium chloride, maize starch and alginic acid, the amount to be used depending on the desired release characteristic and the nature of the agent.

Permitted colors, light stabilizers, flavor additives or sweeteners can also be added to the material to be pelletized.

Pellets produced by the process according to the invention can contain up to 100% of active ingredient if no auxiliaries are required. They can also contain no active ingredient at all if it is desired to produce pellets which are free from active ingredient. Usually, however, it will be necessary to add a certain amount of auxiliaries to the material to be pelletized. Pellets produced according to the invention can therefore contain the following in addition to the active ingredient:

0% to 99%, preferably up to 80%, of fillers; and/or
0% to 20%, preferably up to 10%, of binders; and/or
0% to 20%, preferably up to 10%, of disintegrating agents; and/or
0% to 20%, preferably up to 10%, of lubricants; and/or
0% to 10%, preferably up to 5%, of surface-active agents; and/or
0% to 99%, preferably up to 80%, of matrix-forming agents delaying the release of the active ingredient.

The percentages are to be understood as being based in each case on the weight of the material to be pelletized and of the dried pellets.

If it is desired to produce sugar-free pellets, which can be important for diabetics, carbohydrate-free auxiliaries and/or carbohydrate-free pellets which are free from active ingredient are taken as initiating particles, together with the active ingredient.

The binder or a mixture of binders can be added in the dry state to the material to be pelletized and said material sprayed with the wetting agent afterwards; however, it can also be added to the material to be pelletized as a solution in the wetting agent.

The pellets produced according to the invention can be provided in conventional manner with a shell, suspended in a suitable liquid for oral administration, filled into capsules, compressed into tablets or filled or incorporated into semi-solid forms for administration to the skin or mucosa.

If the pellets are provided with a shell, this can be resistant to gastric juices, although it does not have to be, so that the release of the active ingredient can be specifically controlled both in the stomach and in the intestinal tract.

The active ingredient can be released by osmosis, diffusion, erosion or dissolution or in some other way, it being possible for the rate of release to be influenced by the type and thickness of the shell and it s permeability.

Pellets with shells which are resistant to gastric juices are neither dissolved nor decomposed in the stomach, but continue unaffected into the intestinal tract, where they are digested, e.g. by enzymes, or decomposed or dissolved if they contain ionizable polyacids or long-chain polymers with ionizable carboxyl groups.

A whole series of such shells with resistance to gastric juices are described in Remington's Pharmaceutical Sciences, 17th edition, page 1637 (1985), published by Mack Publishing Co., Eastn, Pa.

In general, pellets with a shell which is resistant to gastric juices release not more than 5% of the active ingredient after 2 hours in an aqueous medium at pH 1, but more than 50% of their active ingredient after 45 minutes in an aqueous medium at pH 7.5, if delayed release of the active ingredient is not additionally intended.

Substances which have proved particularly suitable for shells are various anionic polymers of methacrylic acid and methyl methacrylate, such as e.g. Eudragit L, S and mixtures thereof, cellulose acetatephthalate, hydroxypropyl methyl cellulose phthalate, polyvinyl acetate-phthalate etc.

The device for the production of the pellets according to the invention contains a mixing vessel, the size of which is chosen according to the amount of material to be processed to pellets. It is therefore easily possible to use mixing vessels with a volume of 500 ml or ones with a volume of 1250 l. A mixing vessel with a volume of approx. 250 l will be chosen for a batch of material to be pelletized which is up to 40 kg and a mixing vessel with a volume of approx. 1250 l will be chosen for a batch which is up to 250 kg.

The mixer and the shape of the mixing vessel can be very varied. The only decisive factor is that the mixer and the shape of the mixing vessel are capable of moving the whole of the material to pelletized with a helical motion along the vessel wall and in the direction of motion of the mixer.

Preferred shapes for suitable mixers are therefore cylindrical. frustoconical, conical or conoidal or a mixture of these shapes; the surfaces of the walls and the vessel floor are smooth.

Mixers which have proved suitable are those of propeller-like construction which are arranged horizontally and rotate about a vertically arranged shaft at a small distance from the vessel floor, and which preferably have at least three blades and sweep approximately the whole of the vessel floor.

The mixing vessel can contain a chopper for breaking up possible agglomerates of the material to be pelletized. It is preferably located on the vessel wall because the agglomerated material which is moving in an orbit in the mixing vessel is moved outwards in the direction of the vessel wall by the prevailing centrifugal forces.

The device can also contain a cooling system, e.g. in the form of a double-walled mixing vessel, and/or monitoring devices for automatic control of the production process or for measuring technological parameters.

The invention will be illustrated in greater detail with the aid of the following Examples, which do not imply a limitation. The percentages are based in each case on the total weight of the dry formulation.

EXAMPLE 1

Pellets with a diameter of 0.5-2.5 mm and containing a high percentage (up to 90%) of water-soluble active ingredient (potassium chloride) as a drug, with controlled release of the active ingredient (resistance to gastric juices), are produced in two batches, (a) and (b).

| Composition of the material to be pelletized and the pellets | |
|---|---|
| Potassium chloride | 90% |
| Microcrystalline cellulose | 6% |
| Povidone (PVP K30) | 4% |

| Process parameters | (a) | (b) |
|---|---|---|
| Batch size in kg | 1 | 40 |
| Wetting agent | $H_2O$ | $H_2O$ |
| Mixer speed in rpm | 200 | 90 |
| Spraying rate in g/min | 5 | 400-100 |
| Relative moisture content of the material during pellet formation | 95% | 95% |
| Process time in min | 60 | 90 |
| Yield of 0.5 to 2.5 mm pellets | 55% | 80% |

The pulverulent constituents of the material to be pelletized are moved with a helical motion in the mixing vessel. Water is then sprayed on to the surface of the rotating material by means of a spraying system. The spraying rates are chosen so that larger agglomerates do not form at any time in said material. When more than 75% of the pellets have obviously reached a diameter of 0.8 mm to 1.2 mm, the addition of water is stopped and the mixer is switched off; the pellets are withdrawn from the mixing vessel and dried on trays in a drying cabinet and the oversizes and undersizes are separated from the desired pellet size by sieving.

The oversizes are then ground to a fine powder and added, together with the undersizes, to the next batch of material to be pelletized. The process can thus be optimized economically so as to minimize the losses of said material.

The pellets are then coated with a shell which is resistant to gastric juices, of up to 10% by weight of lacquer solids, based on the weight of pellets.

| Composition of the shell | |
|---|---|
| Eudragit ® L 30 D | 47.6 parts |
| Diethyl phthalate | 2.85 parts |
| Talc | 2.85 parts |
| Purified water | ad 100 parts |

The pellets are then filled into hard gelatin capsules.

EXAMPLE 2

Pellets with a diameter of 0.5-2.5 mm and containing a high percentage (up to 96%) of a water-soluble active ingredient—in this case tetracycline hydrochloride—as a drug, with controlled release of the active ingredient, are produced in two batches, (a) and (b), with different wetting agents.

The process of Example 1 is repeated except that tetracycline hydrochloride and polyethylene glycol are used according to the following composition:

| Composition of the material to be pelletized and the pellets | |
|---|---|
| Tetracycline hydrochloride | 96% |
| Polyethylene glycol | 4% |

| Process parameters | (a) | (b) |
|---|---|---|
| Batch size in kg | 40 | 40 |
| Wetting agent | $H_2O$ | ethanol/$H_2O$ 70%/30% (v/v) |
| Mixer speed in rpm | 90 | 90 |
| Spraying rate in g/min | 350-150 | 350-150 |
| Relative moisture content of the material during pellet formation | 90% | — |
| Process time in min | 60 | 70 |

-continued

| Process parameters | (a) | (b) |
|---|---|---|
| Yield of 0.5 to 2.5 mm pellets | 72% | 85% |

In variant (b), an ethanol/water mixture (70%/30% v/v) is used as the wetting agent; this makes it possible to increase the yield of pellets in a batch.

Subsequent coating with 10% of lacquer solids, based on the weight of pellets, gives a delayed release of active ingredient of 50% after 3 hours under in vitro conditions according to USP XXII.

| Composition of the shell | |
|---|---|
| Eudragit ® RL 30 D | 47.6 parts |
| Diethyl phthalate | 2.85 parts |
| Talc | 2.85 parts |
| Purified water | ad 100 parts |

The pellets are then filled into hard gelatin capsules.

EXAMPLE 3

Pellets with a diameter of 0.5 to 2.5 mm and containing 25% of a lipophilic liquid active ingredient —in this case α-tocopherol—as a drug, with a protective shell, are produced in two batches, (a) and (b), of different size.

| Composition of the material to be pelletized and the pellets | |
|---|---|
| α-Tocopherol | 25% |
| Lactose | 12% |
| Microcrystalline cellulose | 60% |
| Hydroxypropyl methyl cellulose | 3% |

| Process parameters | (a) | (b) |
|---|---|---|
| Batch size in kg | 30 | 200 |
| Wetting agent | H₂O | H₂O |
| Mixer speed in rpm | 140 | 90 |
| Spraying rate in g/min | 300-100 | 450-200 |
| Relative moisture content of the material during pellet formation | 97% | 97% |
| Process time in min | 65 | 200 |
| Yield of 0.5 to 2.5 mm pellets | 94 | 92 |

In this Example, the lipophilic liquid active ingredient is adsorbed in a first step on to the surface of a mixture of lactose and microcrystalline cellulose by uniform application of the liquid to the powder mixture. The resulting mixture, which has a dry appearance, exhibits good flow properties; hydroxypropyl methyl cellulose is added. The procedure is then analogous to Example 1 again.

Finally, coating with 10% of lacquer solids, based on the weight of pellets, gives the pellets permanently free-flowing properties and a good stability.

| Composition of the shell | |
|---|---|
| Methyl cellulose (Methocel ® A15) | 10 parts |
| Talc | 10 parts |
| Purified water | 80 parts |

The pellets are filled into capsules or incorporated into suspensions for oral or topical use.

EXAMPLE 4

Pellets with a diameter of 0.5–2.5 mm and containing less than 10% of a poorly water-soluble active ingredient—in this case dihydroergotamine mesylate or DHETMS—as a drug, with controlled release of the active ingredient, are produced.

| Composition of the material to be pelletized and the pellets | |
|---|---|
| DHETMS | 5% |
| Microcrystalline cellulose | 50% |
| Lactose | 30% |
| Eudragit ® RL/NE 30 D | 15% |

| Process parameters | |
|---|---|
| Batch size in kg | 50 |
| Wetting agent | Eudragit ® RL/NE 30 D in aqueous suspension |
| Mixer speed in rpm | 90 |
| Spraying rate in g/min | 400-100 |
| Relative moisture content of the material during pellet formation | 85% |
| Process time in min | 180 |
| Yield of 0.5–2.5 mm pellets | 82% |

The procedure is analogous to Example 1; the material to be pelletized is wetted with the Eudragit suspension instead of water.

In these pellets, the controlled release of the active ingredient results from their polymeric matrix.

The pellets are then compressed into tablets with suitable auxiliaries.

EXAMPLE 5

Pellets with a diameter of 0.5–2.5 mm are produced analogously to Example 4.

| Composition of the material to be pelletized and the pellets | |
|---|---|
| DHETMS | 5% |
| Microcrystalline cellulose | 23% |
| Lactose | 70% |
| Povidone (Kollidon K 30) | 2% |

| Process parameters | |
|---|---|
| Batch size in kg | 25 |
| Wetting agent | H₂O |
| Mixer speed in rpm | 90 |
| Spraying rate in g/min | 300-100 |
| Relative moisture content of the material during pellet formation | 96% |
| Process time in min | 120 |
| Yield of 0.5–2.5 mm pellets | 92% |
| Yield of 0.8–1.2 mm pellets | 76% |

The procedure is analogous to Example 1.

The pellets are then coated with a shell of up to 6% of lacquer solids, based on the weight of pellets, which controls the release of the active ingredient.

| Composition of the shell | |
|---|---|
| Aquacoat ® | 47.6 parts |
| Triethyl citrate | 2.85 parts |
| Talc | 2.85 parts |

| | |
|---|---|
| Purified water | ad 100 parts |

The pellets are then filled into hard gelatin capsules.

EXAMPLE 6

Pellets with a diameter of 0.8-1.4 mm and containing an active ingredient from the therapeutic group of the non-steroidal antirheumatics (NSAID's)—in this case diclofenac—as a drug, with controlled release of the active ingredient, are produced.

| Composition of the material to be pelletized and the pellets | |
|---|---|
| Diclofenac sodium | 50% |
| 0.8 ± 0.2 mm diameter pellets free from active ingredient | 40% |
| Microcrystalline cellulose | 5% |
| Povidone K 30 | 5% |

| Process parameters | |
|---|---|
| Batch size in kg | 65 |
| Wetting agent | $H_2O$ |
| Mixer speed in rpm | 90 |
| Spraying rate in g/min | 80-50 |
| Relative moisture content of the material during pellet formation | 82% |
| Process time in min | 90 |
| Yield of 0.8-1.4 mm pellets | 96% |

The pellets which are free from active ingredient are moved with a helical motion in the mixing vessel. Water is then sprayed on to the surface of the rotating pellets by means of a spraying system. The powder mixture of active ingredient, cellulose and povidone is metered in simultaneously by means of a suitable feed device. The spraying rates and the metering of the powder are chosen so that larger agglomerates are not formed at any time.

When the requisite amount of powder has been incorporated, the addition of water is stopped, the mixer is switched off, the pellets are withdrawn from the mixing vessel and dried on trays in a drying cabinet and the oversizes and undersizes with the powder components are separated from the desired pellet size by sieving.

Subsequent coating with 10% of lacquer solids, based on the weight of pellets, gives a delayed release of the active ingredient of 20% per hour under in vitro conditions according to USP XXI.

| Composition of the shell | |
|---|---|
| Eudragit RL 30 D | 47.6 parts |
| Macrogol 6000 | 4.3 parts |
| Talc | 2.85 parts |
| Purified water | ad 100 parts |

The pellets are then filled into hard gelatin capsules

EXAMPLE 7

Pellets with a diameter of 1.0-1.5 mm and containing an active ingredient from the therapeutic group of the beta-blockers—in this case propanolol hydrochloride—as a drug, with controlled release of the active ingredient, are produced.

| Composition of the material to be pelletized and the pellets | |
|---|---|
| Sodium citrate (500 nm) | 48% |
| Propanolol hydrochloride | 48% |
| Kollidon VA 64 | 4% |

| Process parameters | |
|---|---|
| Batch size in kg | 10 |
| Wetting agent | $H_2O$ |
| Mixer speed in rpm | 100 |
| Spraying rate in g/min | 60 |
| Relative moisture content of the material during pellet formation | 80% |
| Process time in min | 60 |
| Yield of 1.0-1.5 mm pellets | 89% |

A high yield of pellets can be obtained with the formulation and the process parameters given above. To do this, the following are initially introduced into a suitable mixer: sodium citrate and about one third of a mixture of propanolol hydrochloride with Kollidon VA 64. By means of a spraying system, water is sprayed on to the surface of the rotating material to be pelletized until rounding is clearly evident.

About another third of the mixture of propanolol hydrochloride with Kollidon VA 64 is then added and spraying is continued. When it is clear that there is no longer a powder component, the last remaining third is added and spraying is continued until all the powder has aggregated to form pellets. Pellets in the size range from 1.0 to 1.5 mm diameter are separated off by sieving and dried in a fluidized bed with inlet air at 40° C.

Finally, coating with 10% of lacquer solids, based on the weight of pellets, gives a delayed release of the active ingredient of 50% after 3.5 hours under in vitro conditions according to USP XXII.

| Composition of the shell | |
|---|---|
| Eudragit ® RS 30 D | 47.6 parts |
| Macrogol 6000 | 2.85 parts |
| Talc | 1.5 parts |
| Iron oxide pigment (red) | 1.5 parts |
| Purified water | ad 100 parts |

The pellets are then filled into hard gelatin capsules.

EXAMPLE 8

Pellets with a diameter of 0.5-0.8 mm and containing a readily water-soluble active ingredient—in this case adenosine triphosphate or ATP—as an agent for skin care are produced which have the possibility of keeping the active ingredient contained and stabilizing it even in highly viscous aqueous media.

| Composition of the material to be pelletized and the pellets | |
|---|---|
| ATP | 5% |
| Microcrystalline cellulose | 40% |
| Calcium phosphate | 50% |
| Preswollen starch (Paselli ® SA2) | 5% |

| Process parameters | |
|---|---|
| Batch size in kg | 2 |

| -continued | |
|---|---|
| Wetting agent | H₂O |
| Mixer speed in rpm | 210 |
| Spraying rate in g/min | 30-10 |
| Relative moisture content of the material during pellet formation | 98% |
| Process time in min | 35 |
| Yield of 0.5-0.8 mm pellets | 72% |

The procedure is analogous to Example 1.
For additional stabilization of the active ingredient, the pellets are coated with a shell of up to 10% by weight of lacquer solids, based on the weight of pellets.

| Composition of the shell | |
|---|---|
| Hydroxypropyl methyl cellulose | 10 parts |
| Talc | 5 parts |
| Purified water | ad 100 parts |

The pellets are then incorporated into semi-solid spreadable bases for application to the skin.

EXAMPLE 9

Pellets with a diameter of 0.5-0.8 mm are produced which can be used as carriers which are free from active ingredient and sugar, in the form of initiating particles, instead of conventional sugar-containing pellets which are free from active ingredient.

| Composition of the material to be pelletized and the pellets | |
|---|---|
| Microcrystalline cellulose | 25% |
| Lactose | 75% |

| Process parameters | |
|---|---|
| Batch size in kg | 100 |
| Wetting agent | H₂O |
| Mixer speed in rpm | 60 |
| Spraying rate in g/min | 500-300 |
| Relative moisture content of the material during pellet formation | 96% |
| Process time in min | 80 |
| Yield of 0.5-0.8 mm pellets | 78% |

The procedure is analogous to Example 1.

EXAMPLE 10

Pellets with a diameter of 1.0-2.0 mm and containing organic-mineral fertilizer, with delayed release of the active ingredient, are produced.

| Composition of the material to be pelletized and the pellets | |
|---|---|
| Organic-mineral fertilizer (containing N, P, K) | 85% |
| Hydroxypropyl methyl cellulose (type: Methocel ® K 100 M) | 15% |

| Process parameters | |
|---|---|
| Batch size in kg | 500 |
| Wetting agent | H₂O |
| Mixer speed in rpm | 45 |
| Spraying rate in g/min | 1000-500 |
| Relative moisture content of the material during pellet formation | 97% |
| Process time in min | 210 |
| Yield of 1.0-2.0 mm pellets | 93% |

The procedure is analogous to Example 1.

EXAMPLE 11

Pellets with a diameter of 1.0-2.0 mm and containing the selective herbicide (R,S)-2-(4-chloro-o-tolyloxy)-propionic acid (Mecoprop) as the active ingredient are produced.

| Composition of the material to be pelletized and the pellets | |
|---|---|
| Mecoprop | 10% |
| Microcrystalline cellulose | 28% |
| Lactose | 60% |
| Povidone (PVP K 30) | 2% |

| Process parameters | |
|---|---|
| Batch size in kg | 500 |
| Wetting agent | H₂O |
| Mixer speed in rpm | 45 |
| Spraying rate in g/min | 1000-500 |
| Relative moisture content of the material during pellet formation | 98% |
| Process time in min | 250 |
| Yield of 1.0-2.0 mm pellets | 90% |

The procedure is analogous to Example 1.
Special precautionary measures must be taken during processing in order to prevent effects on the skin, eyes and respiratory system.
The pellets are then filled into bags.

EXAMPLE 12

Pellets with a diameter of 1.0-2.5 mm and containing the contact insecticide O,O-dimethyl O-(3-methyl-4-methylthiophenyl) monothiophosphate (Fenthion) as the active ingredient are produced.

| Composition of the material to be pelletized and the pellets | |
|---|---|
| Fenthion | 10% |
| Lactose | 17% |
| Microcrystalline cellulose | 70% |
| Hydroxypropyl methyl cellulose | 3% |

| Process parameters | |
|---|---|
| Batch size in kg | 500 |
| Wetting agent | H₂O |
| Mixer speed in rpm | 45 |
| Spraying rate in g/min | 1000-500 |
| Relative moisture content of the material during pellet formation | 99% |
| Process time in min | 240 |
| Yield of 1.0-2.5 mm pellets | 88% |

The procedure is analogous to Example 1. Special precautionary measures must be taken during processing in order to prevent inhalation and contact with the skin and eyes.
The pellets are then filled into cans.

EXAMPLE 13

Pellets with a diameter of 1.2-2.5 mm and containing wood dust from filter residues are produced for further processing in the construction and plastics industries.

| Composition of the material to be pelletized and the pellets | |
|---|---|
| Wood dust, very fine | 95% |
| Povidone (Kollidon K 30) | 5% |

| Process parameters | |
|---|---|
| Batch size in kg | 600 |
| Wetting agent | H₂O |
| Mixer speed in rpm | 45 |
| Spraying rate in g/min | 900 |
| Relative moisture content of the material during pellet formation | 98% |
| Process time in min | 180 |
| Yield of 1.2-2.5 mm pellets | 90% |

The procedure is analogous to Example 1; however, the pellets are advantageously dried in a fluidized bed; the pellets do not need to be fractionated by sieving.

EXAMPLE 14

Pellets with a diameter of 0.9-1.2 mm and containing methylene blue as a reagent are produced.

| Composition of the material to be pelletized and the pellets | |
|---|---|
| Methylene blue | 5% |
| Sodium chloride, powder | 92% |
| Hydroxypropyl methyl cellulose | 3% |

| Process parameters | |
|---|---|
| Batch size in kg | 300 |
| Wetting agent | H₂O |
| Mixer speed in rpm | 50 |
| Spraying rate in g/min | 600-150 |
| Relative moisture content of the material during pellet formation | 92% |
| Process time in min | 270 |
| Yield of 0.9-1.2 mm pellets | 78% |

The procedure is analogous to Example 1.

To improve handling, the pellets are coated with a protective shell of up to 2% by weight of lacquer solids, based on the weight of pellets.

| Composition of the shell | |
|---|---|
| Hydroxymethyl propyl cellulose | 7.5 parts |
| Talc | 7.5 parts |
| Purified water | ad 100 parts |

The pellets are then filled into dosage bags.

We claim:

1. A process for the production of pellets, comprising passing the material to be pelletized through a mixer with an approximately helical centrifugal motion in an orbit in the direction of motion of the mixer in the mixing vessel and, by continuous or batchwise application of a finely nebulized wetting agent, which may contain a binder, to said material until the relative moisture content is at least 70%, measured in the stream of material, the agglomeration of said material is maintained until pellets with a diameter of 0.5 mm to 2.5 mm are obtained.

2. A process according to claim 1, further comprising the material to be pelletized containing at least one active ingredient.

3. A process according to claim 1, comprising applying the active ingredient to pellets, crystals or other initiating particles which are free from active ingredient.

4. A process according to claim 1, comprising sprinkling continuously or batch wise the active ingredient on to initiating particles rotating int he mixing vessel and simultaneously spraying with a wetting agent.

5. A process according to claim 1 wherein the pellets obtained are first dried and the desired size is separated from undersizes and oversizes by sieving, or sieving is followed by drying.

6. A process according to claim 1, comprising operating the mixer in the speed range from 100 to 500 rpm when the batches of material to be pelletized are up to 20 kg and in the speed range from 40 to 200 rpm when the batches are over 20 kg.

7. A process according to claim 1, wherein relative moisture content is in the range from 85% to 95%.

8. A process according to claim 1, wherein the process temperature does not exceed 40° C.

9. A process according to claim 1, wherein the duration of the process does not exceed 360 minutes.

10. A process according to claim 1, wherein the oversizes, after comminution, or the undersizes are added to a subsequent production charge.

11. A process according to claim 2, wherein the active ingredient is soluble, sparingly soluble or insoluble in water.

12. A process according to claim 1, wherein water, by itself or in combination with an organic solvent, is used as the wetting agent.

13. The process of claim 1 wherein the agglomeration of said material is maintained until the pellets with a diameter of 0.8 mm to 1.4 mm are obtained.

14. The process of claim 2 further comprising the material to be pelletized containing at least one auxiliary.

15. A process according to claim 14, wherein at least one filler or binder, disintegrating agent, lubricant, surface-active agent, color, flavoring or sweetener is used as the auxiliary.

16. A process according to claim 14 comprising adding as the auxiliary an agent delaying the release of the active ingredient by mixing it directly with the material to be pelletized or with the wetting agent.

17. The process of claim 14 further comprising at least part of the active ingredient being initially introduced into the mixing vessel.

18. The process of claim 14 further comprising initially introducing all of the active ingredient into the mixing vessel.

19. The process of claim 4 further comprising sprinkling continuously or batchwise adding at least one auxiliary.

20. The process of claim 19 wherein the wetting agent further comprises a binder.

21. The process of claim 7 wherein the relative moisture content is 90%.

22. The process of claim 8 wherein the temperature is in the range from 25° to 35° C.

23. The process of claim 9 wherein the duration is between 30 and 120 minutes.

24. The process of claim 12 wherein said organic solvent is a lower alcohol.

* * * * *